United States Patent [19]

Buehler et al.

[11] Patent Number: 4,924,349

[45] Date of Patent: May 8, 1990

[54] FACE PLATE ASSEMBLY FOR ELECTRICAL DEVICES

[75] Inventors: David L. Buehler, Bethlehem; Elliot G. Jacoby, Glenside; Rita Swartvagher, Philadelphia, all of Pa.

[73] Assignee: Lutron Electronics Co., Inc., Coopersburg, Pa.

[21] Appl. No.: 191,921

[22] Filed: May 9, 1988

[51] Int. Cl.⁵ .............................................. H02B 1/04
[52] U.S. Cl. ...................................... 361/357; 174/55; 362/95; 200/297; 200/308
[58] Field of Search ............... 200/293, 296, 297, 252, 200/308, 317, 310–313, 330; 174/53, 55, 58, 48, 66; 439/535, 538, 539, 569, 570; 361/356, 417, 357, 419, 360, 420; 248/27.1, 27.3; 362/95; 338/162, 163, 176

[56] References Cited

U.S. PATENT DOCUMENTS

| | | | |
|---|---|---|---|
| 2,740,873 | 4/1956 | Cronk | 200/168 |
| 3,197,549 | 7/1965 | Good | 174/66 |
| 3,639,745 | 2/1972 | Shiki | 174/58 |
| 3,735,020 | 5/1973 | Licata | 174/66 |
| 4,255,637 | 3/1981 | Matsuda | 200/293 |
| 4,255,780 | 3/1981 | Sakellaris | 362/95 |
| 4,340,795 | 7/1982 | Arthur | 200/296 |
| 4,455,546 | 6/1984 | Roszel | 200/330 |
| 4,500,746 | 2/1985 | Meehan | 174/48 |
| 4,563,592 | 1/1986 | Yuhasz et al. | 307/115 |

OTHER PUBLICATIONS

Lutron Electronics Co.-Nova® Brochure P/N 362-023.
Robertshaw Controls Company-Installation Instructions for Heating Thermostat Model T10-1141.
Albrecht Jung Elektrotechnische Fabrik, Katalog 85, pp. 11, 14.

*Primary Examiner*—Gerald P. Tolin
*Attorney, Agent, or Firm*—James Riesenfeld

[57] ABSTRACT

A wallbox-mountable face plate assembly includes a support plate for the control device, an intermediate plate that attaches to the support plate, and a face plate that snaps onto the intermediate plate. The face plate has a particularly simple construction, requiring no mounting structure on the interior of the back surface. The intermediate plate may be painted to match, or to contrast with, the color of the wall on which the assembly is to be mounted. Alternatively, the intermediate plate could be translucent and backlighted to provide a night light or pilot light.

18 Claims, 5 Drawing Sheets

FACE PLATE ASSEMBLY FOR ELECTRICAL DEVICES

BACKGROUND OF THE INVENTION

1. Field of the Invention

This invention relates to a wallbox-mountable face plate assembly and, more particularly, to an assembly that includes a three-piece mounting arrangement.

2. Description of the Related Art

Wallbox-mountable electrical controls are well known and in widespread use. In many cases, these controls are simple toggle switches to turn on and off lights, or other electrically-powered devices, or both. In other cases, the control in the wallbox is a dimmer, which can continuously vary power to a load, typically a lighting load or a motor.

A variety of face plate assemblies have been designed to cover the wall box and wiring, while still permitting access to the electrical control. A plate with a rectangular slot is a simple configuration often used with a toggle switch. More complex configurations have been designed to serve various functional or aesthetic considerations.

An assembly for use with a push-button switch was disclosed in U.S. Pat. No. 2,740,873, issued Apr. 3, 1956, to K. P. Cronk. That assembly comprises a backing plate, which supports an electrical switch, and a face plate, which covers and attaches to the backing plate. The backing and face plates have openings to accommodate a button that operates the switch. The face plate is held in place on the backing plate by pins that are invisible from the exterior.

A touch switch assembly that likewise has a face plate whose mounting means are not visible from the front of the plate was disclosed in U.S. Pat. No. 4,563,592, issued Jan. 7, 1986 to S. J. Yuhasz et al.

A push-button light switch sold under the "Jung" name, in Germany, comprises a mounting plate assembly that includes flexible snaps to connect with mating members on a cover plate/push-button.

An assembly designed for use with a linear slide dimmer is disclosed in copending U.S. application Ser. No. 032,484, filed Mar. 30, 1987, for a Two Piece Face Plate for Wall Box Mounted Device, incorporated herein by reference. That application discloses a cover designed for use with a particular type of wallbox-mounted electrical control that has an integral yoke plate with a shallow insulating escutcheon protruding from its front surface (i.e., the surface away from the wallbox).

Another linear slide dimmer assembly is the NOVA® dimmer, sold by Lutron Electronics Co. That assembly includes a metal yoke that mounts to a wallbox, a slide that moves between rails on the yoke, and a faceplate that has, on its back surface (facing the wallbox), snaps that connect to the rails.

As was discussed above, many of the assemblies of the prior art permit the use of a face plate that snaps onto an adjoining member; however, they all require structural elements on the interior of the rear surface of the face plate to connect with corresponding connecting elements on the adjoining member. The need for these elements on the face plate members complicates their fabrication.

SUMMARY OF THE INVENTION

In accordance with the present invention, a wallbox-mountable face plate assembly comprises, in combination, (a) a wiring device;

(b) a generally flat support plate for said device, removably attachable to said wallbox;

(c) a generally flat intermediate plate, removably attachable to said support plate, having a first surface that is adjacent to a surface of said support plate when said plates are attached and, opposite said first surface, a second surface that faces outward when said plates are mounted in a wallbox, said second surface being interrupted by a peripheral, outward-facing first cantilever snap; and (d) a face member having a peripheral, inward-facing first connector for demountable engagement with said first cantilever snap on said intermediate plate.

The assembly permits a face plate member to be mounted without tools and without any outward signs of the mounting mechanism, while permitting this member to have a simple structure, easily-fabricated from a wise variety of materials.

DETAILED DESCRIPTION OF THE INVENTION

The present invention provides an assembly that permits snap-mounting of a simplified face plate onto a wallbox-mounted wiring device. For clarity of explanation, we define "top" and "bottom" and "front" and "rear" with reference to the assembly when it is mounted in the wallbox. A rear surface is, then, a surface that faces inward toward the wallbox; a front surface faces outward. "Longitudinal" refers to up and down, "lateral" to left and right.

Figure 1:
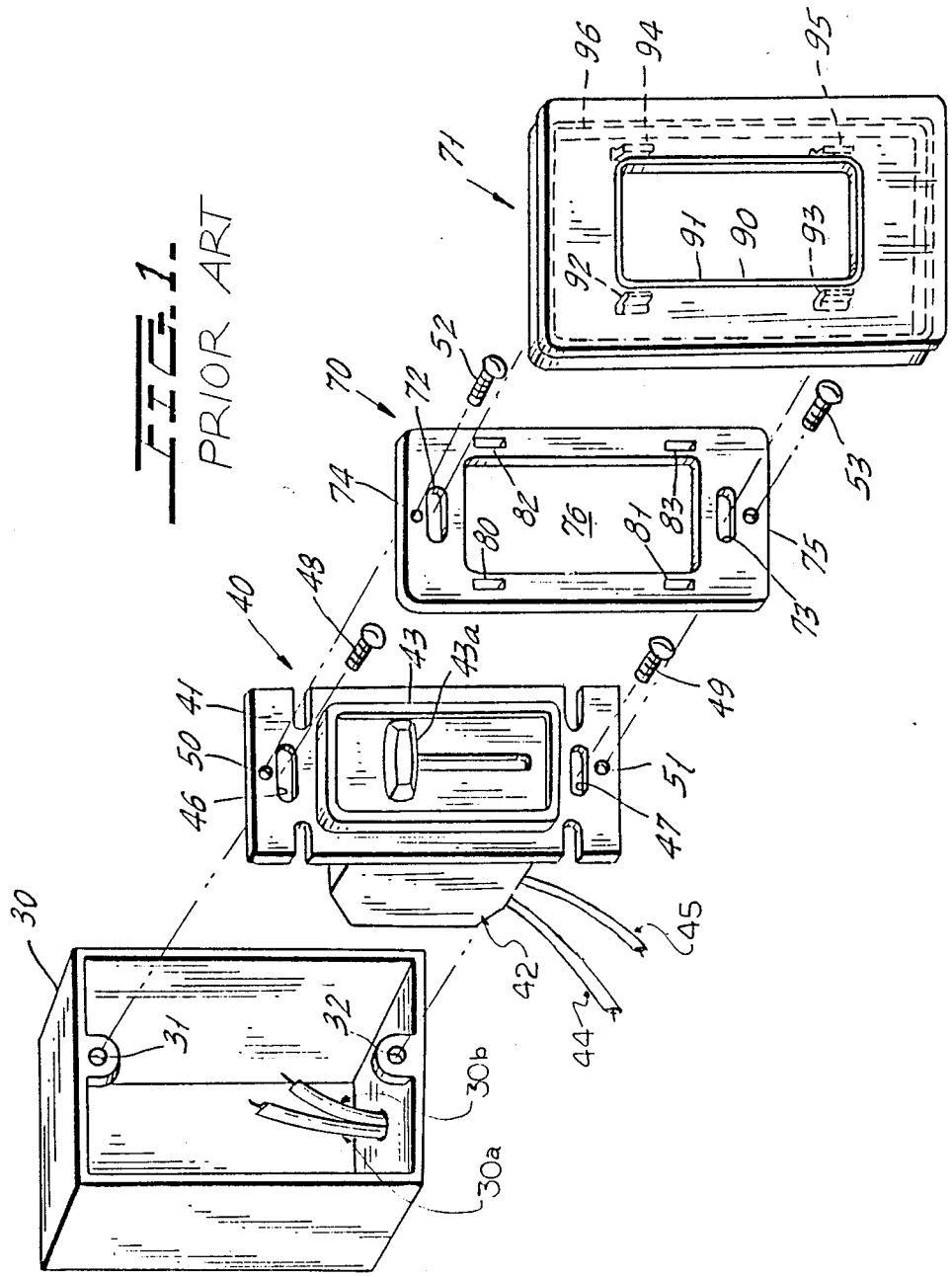
FIG. 1 is an exploded view of a prior art wallbox, light dimmer, and face plate.

FIG. 1 shows a conventional metal wallbox 30, which is adapted to be mounted within the wall of a building. The wallbox, whose opening is generally flush with the surface of the wall, provides a metallic enclosure to receive a wiring device. Other wallboxes can be used in connection with the invention, including wallboxes having insulation body portions. "Wiring device," when use in the present specification and claims, is to be interpreted broadly, to include receptacles, jacks, displays, outlets, switches, dimmers, and other devices that may be mounted in wallboxes.

Wallbox 30 has "knock-outs" to permit the introduction of electrical wiring, which extends through the building walls, shown as wires 30a and 30b in FIG. 1. Wires 30a and 30b are part of the building wiring and can be connected to lamp loads or the like which are to be controlled by the electrical control device. Wallbox 30 is also provided with threaded mounting openings 31 and 32, which are on standard centers and are adapted to receive mounting screws for mounting a control device within wallbox 30.

Wiring device 40 of FIG. 1 is a light dimmer. Light dimmer 40 consists of a metallic yoke plate 41 having a backbox 42 on its rear surface and a rectangular escutcheon 43 extending from its front surface.

A manually operable slider has a slider handle 43a projecting beyond the front surface of escutcheon 43. Movement of the handle between its end positions causes dimming of the lighting load and, when the lowest position is reached, causes the opening of a switch that is in series with wires 44 and 45 to turn off the lighting load.

Backbox 42 encloses the control mechanism of dimmer 40 and insulates it from accidental contact with wires or grounds in wallbox 30. Leads 44 and 45 extend through an opening in backbox 42 and may be connected to wires 30a and 30b.

Yoke plate 41, which preferably is a generally flat thin metal stamping, is of conventional structure and has two laterally elongated openings 46 and 47 for receiving mounting screws 48 and 49. Screws 48 and 49 pass through openings 46 and 47, respectively, and are threaded into openings 31 and 32, respectively, to mount dimmer 40 to wallbox 30. Yoke 41 also has tapped openings 50 and 51, which are on standard centers and receive screws 52 and 53.

Adapter plate 70 is a generally flat plate having laterally elongated openings 72 and 73 which are sufficiently large to receive the protruding heads of screws 48 and 49 after those screws are screwed into place in wallbox 30. Screws 52 and 53 thread into openings 50 and 51, respectively, in order to hold adapter plate 70 to yoke 41. Openings 74 and 75 receive screws 52 and 53, and opening 76 receives escutcheon 43.

Wall plate 71 has a rectangular opening 90, which fits over escutcheon 43, and connectors 92, 93, 94, and 95, which are elongated pedestals adapted to penetrate and then snap behind openings 80 to 83, respectively, in adapter plate 70.

The assembly of the present invention includes, beginning at the rear, a wiring device that fits on or within a wallbox, a support plate for the device, an intermediate plate that mounts against the front surface of the support plate, and a face member that mounts against the front surface of the intermediate plate. The intermediate plate preferably has a generally rectangular shape.

The wiring device can take a variety of forms, including an on-off switch, a dimmer, or a combination dimmer and switch. By "dimmer" we mean a device that controls the power to a load, which could be a lighting load, a motor, or other electrical load.

Figure 2:
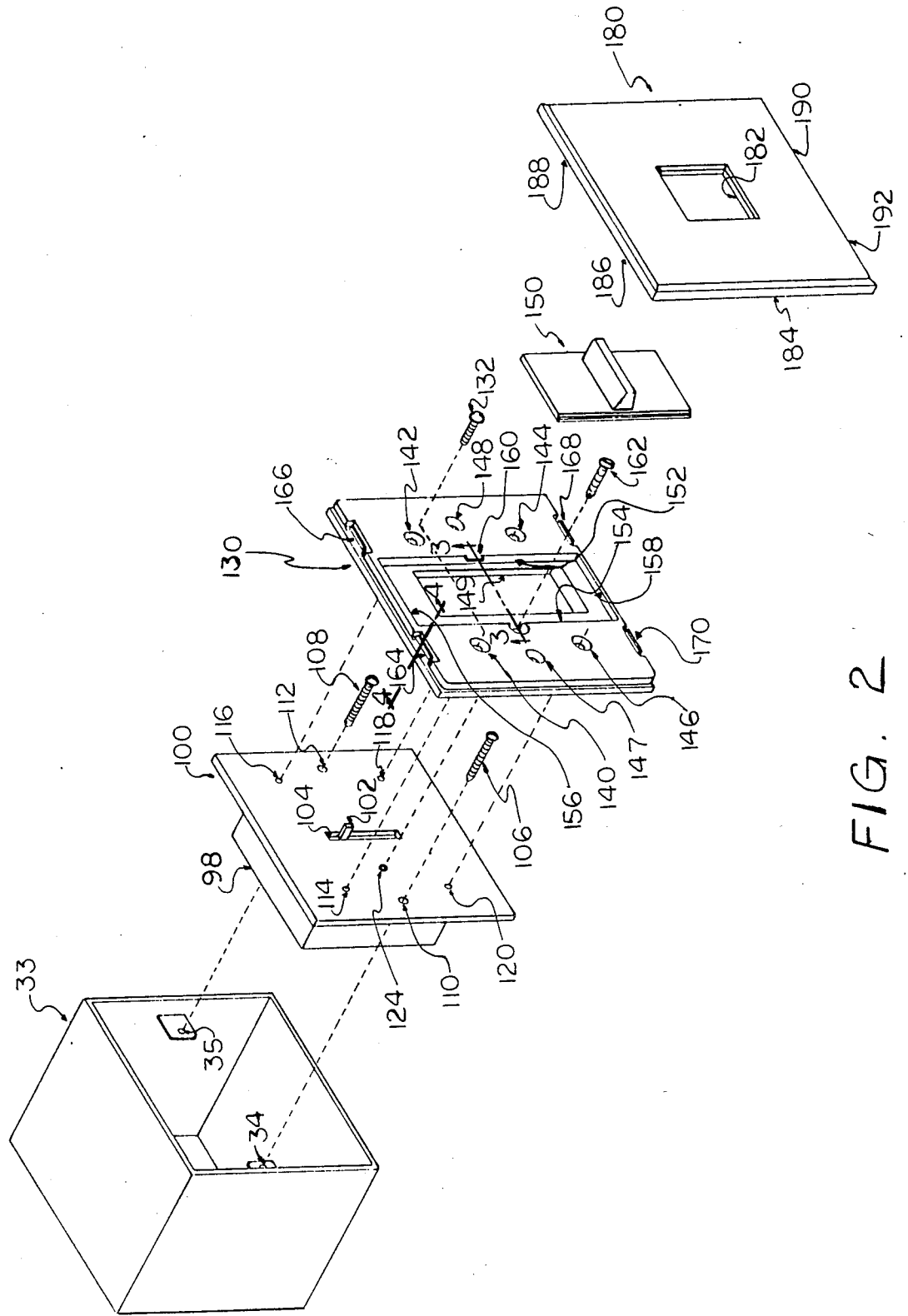
FIG. 2 is an exploded view of an embodiment of the present invention.

FIG. 2 depicts an embodiment of the present invention, together with a wallbox into which it mounts. Wallbox 33 can be of the same type as is shown in FIG. 1, which is a style of wallbox commonly used in the U.S. However, in FIG. 2, wallbox 33 is of a type more commonly used in the United Kingdom and other Western European countries. Thus, wallbox 33 has a square front opening and laterally spaced tapped holes 34 and 35.

Wiring device 98 is mounted on the rear surface of support plate 100. In the embodiment shown, wiring device 98 is a linear slide dimmer, including a slide potentiometer whose shaft 102 protrudes from slot 104 in plate 100. To join support plate 100 to wallbox 33, screws 106 and 108 pass through holes 110 and 112 and screw into tapped holes 34 and 35, respectively. Tapped holes 114, 116, 118, and 120 receive screws for mounting the intermediate plate, and hole 124 receives an optional capture screw, as described below. Support plate 100 may be of any rigid material, metallic or non-metallic. Slot 104 may be longitudinal (as shown) or lateral.

Figure 3:
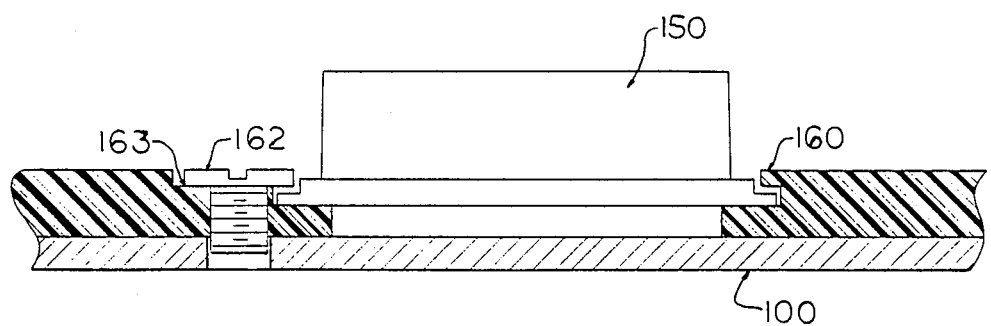
FIG. 3 is a cross section taken along line 3—3 of FIG. 2.

Intermediate plate 130 is attached to support plate 100 by four screws. For clarity, screw 132 is shown, but the corresponding screws 134, 136, and 138 are not. The screws pass through holes 140, 142, 144, and 146 into holes 114, 116, 118, and 120, respectively. Openings 147 and 148 receive the heads of screws 106 and 108. Slot 149 permits shaft 102 to pass to slider 150, which captures the shaft and moves it up and down as it slides in a channel bounded by guide edges 152 and 154 and stop edges 156 and 158. Capturing the slider so that it cannot be removed without a tool is an advantage from a safety standpoint. As shown in FIG. 2, slider 150 is optionally captured by tab 160 and capture screw 162. These elements are shown in more detail in FIG. 3, which is a cross section taken along line 3—3. As shown in FIG. 3, lip 163 determines the position of the head of screw 162 for capturing slider 150. Cantilever snaps 164, 166, 168, and 170 may be formed, among other ways, by cutting away surrounding material of intermediate plate 130 or by molding.

Face plate 180, with length and width dimensions slightly greater than those of intermediate plate 130, covers the latter, except for opening 182, which provides access to slider 150 along its range of travel. An integral, inward-extending flange 184 defines the perimeter of face plate 180 and covers at least a part of the perimeter of intermediate plate 130. For connecting face plate 180 to intermediate plate 130, the interior face of flange 184 has protrusions 186, 188, 190, and 192, of a generally triangular cross section, to connect to cantilever snaps 164, 166, 168, and 170, respectively. Note that there is no need for any structures (akin to connectors 92, 93, 94, and 95 on the prior art structure of FIG. 1) on the interior of the back surface of face plate 180 for snap mounting. Likewise, the front surface need have no features that relate to mounting. This permits the face plate to have a particularly simple and sturdy structure, readily fabricated from a variety of materials.

Figure 4:
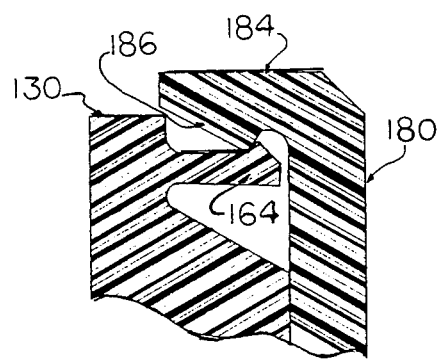
FIG. 4 is a cross section taken along line 4—4 of FIG. 2.

FIG. 4 is a cross section along line 4-4 through cantilever snap 164 on intermediate plate 130 and connector protrusion 186 on flange 184 of face plate 180. A single cantilever snap-connector pair may be used. Preferably, cantilever snaps are at two opposite ends of intermediate plate 130, with corresponding connectors on flange 184. More preferably, as shown in FIG. 2, there are four snaps like 164 and four mating connectors like 186. Alternatively, a snap could extend along an entire edge of plate 130, a protrusion could extend along an entire face of flange 184, or both. If a protrusion extends along an entire face, the corresponding edge of plate 130 could be cut away slightly, if necessary, to accept it.

As shown in FIG. 2, cantilever snaps 164 and 166, 168 and 170 are at the top and bottom edges respectively of intermediate plate 130. Clearly, the snaps could be on the left and right edges instead (or in addition). Having the snaps at the top and bottom edges facilitates lateral "ganging"; that is, having more than one device mounted side-by side. In that case, a single "multi-gang" face plate can cover the devices. For the same reason, snaps at the left and right edges are preferred for longitudinal ganging, which is less common, however.

Figure 5A:
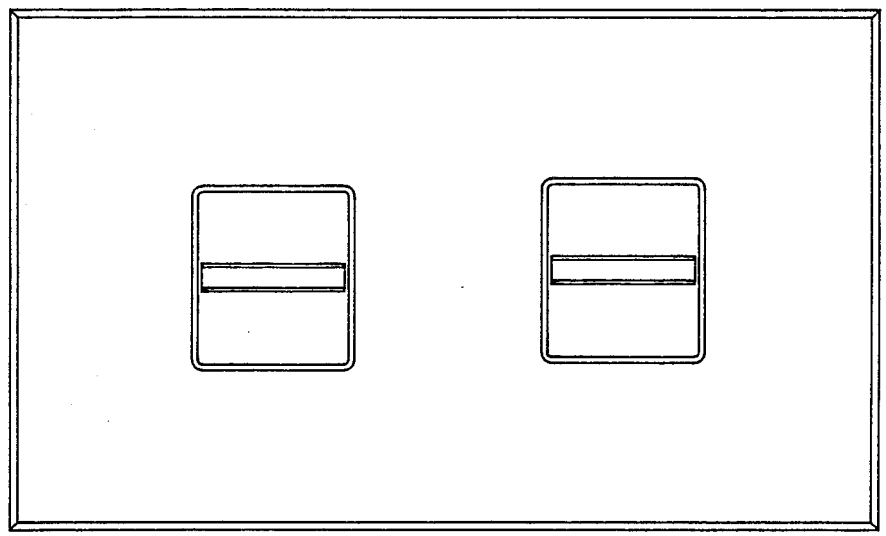
FIG. 5A and 5B are elevational views of other embodiments of the present invention.
Figure 5B:
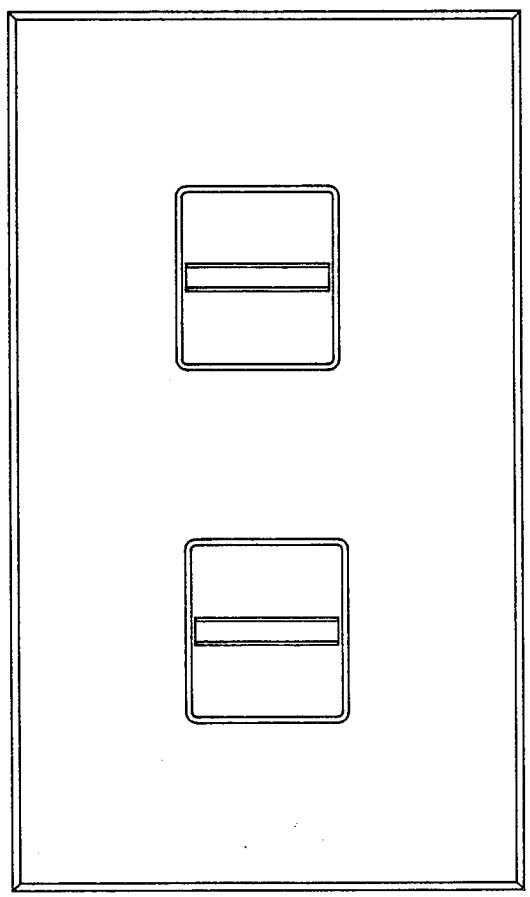

FIG. 5A depicts a multi-gang face plate covering two side-by-side mounted dimmers. FIG. 5B depicts a multi-gang face plate covering two dimmers mounted one below the other.

Figure 6:
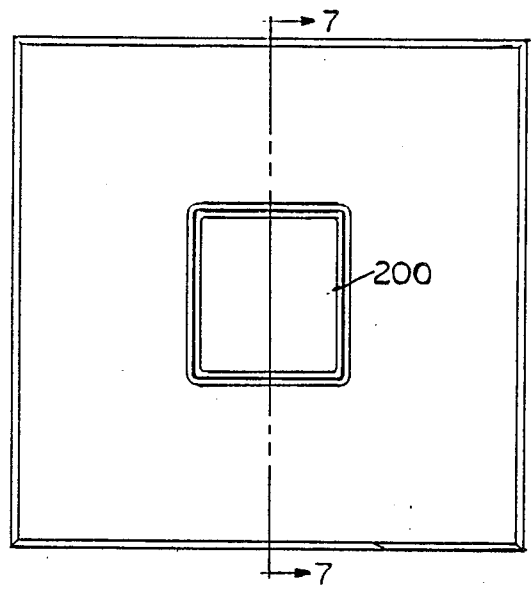
FIG. 6 is an elevational view of the front surface of an alternative embodiment of this invention.

Wiring device 98 may be a switch, rather than a dimmer. Face plate member 180 may have an opening (like 182) to provide access to the switch. Alternatively, it may have no opening in order to impede, and to limit, access to the switch. FIG. 6 depicts an embodiment in which the wiring device is a push-button switch actuated through an opening in the face plate by a touch plate 200.

Figure 7:
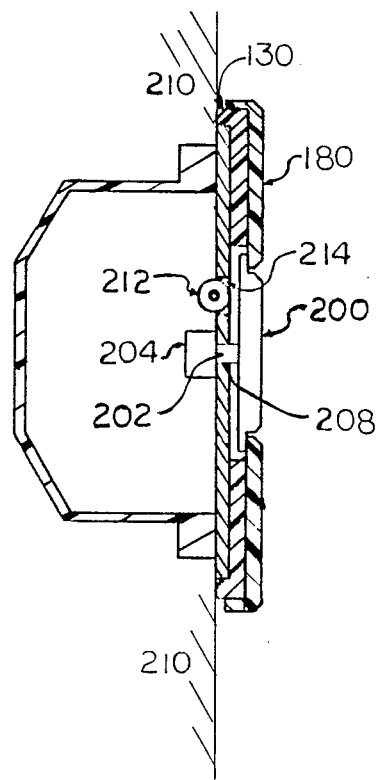
FIG. 7 is a cross section taken along the line 7—7 in FIG. 6.

FIG. 7 depicts a cross section taken along line 7—7 of FIG. 6. Depressing touch plate 200 causes plunger 202 to open and close the switch contacts in element 204. Plunger 202 passes through clearance hole 208 in support plate 100.

In the embodiment of FIG. 7, intermediate plate 130 is visible behind face plate 180 when the assembly is viewed at a large angle to a normal to the touch plate. If desired, intermediate plate 130 can be painted to match—or to contrast with—the color of the wall 210 on which the assembly is mounted. Alternatively, intermediate plate 130 could be translucent; that is, it transmits at least a substantial fraction of light incident upon it. In that case, the intermediate plate could be backlighted by lamp 212 through opening 214 in support plate 100 to provide an attractive appearance, with an opaque or translucent face member. In this embodiment, the light can function as a night light or pilot light. Methods for placing a lamp in a wallbox to provide backlighting are well known, and one method is described in U.S. Pat. No. 3,864,561, issued Feb. 4, 1975, to J. S. Spira et al., and incorporated herein by reference.

Since certain changes may be made in the assembly and face member described above, without departing from the scope of the inventions involved, it is intended that all matter contained in the description or shown in the accompanying drawings shall be interpreted in an illustrative and not in a limiting sense.

We claim:

1. A wallbox-mountable face plate assembly comprising, in combination,
   (a) a wiring device;
   (b) a generally flat support plate supporting said device, removably attachable to said wallbox;
   (c) a generally flat intermediate plate, removably attached to said support plate, having a first surface that is adjacent to a surface of said support plate and, opposite said first surface, a second surface that faces outward when said plates are mounted in a wallbox, said second surface being interrupted by a peripheral, outward-facing first cantilever snap; and
   (d) a face member having a peripheral, inward-facing first connector demountably engaged with said first cantilever snap on said intermediate plate.

2. The assembly of claim 1 in which said intermediate plate has a generally rectangular shape.

3. The assembly of claim 2 in which said face member has a generally rectangular perimeter and said connector is attached to an inward-extending peripheral flange on said face member.

4. The assembly of claim 3 in which said face member has length and width slightly greater than the length and width, respectively, of said intermediate plate.

5. The assembly of claim 3 further comprising a second peripheral cantilever snap, which interrupts said second surface at the opposite end from said first cantilever snap, and a corresponding second connector, attached to an inward-extending peripheral flange, in engagement with said second cantilever snap.

6. The assembly of claim 5 in which said cantilever snaps are at the top and bottom ends of said intermediate plate.

7. The assembly of claim 1 in which a plurality of peripheral outward-facing cantilever snaps interrupt said second surface of said intermediate plate and said face member has a corresponding peripheral inward-facing connector in demountable engagement with each of said cantilever snaps.

8. The assembly of claim 7 in which said intermediate plate and said face member each have a generally rectangular shape, the face member has length and width slightly greater than the length and width, respectively, of said intermediate plate, and each of said connectors is attached to an inward-extending peripheral flange on said face member.

9. The assembly of claim 1 in which said device comprises a switch, mounted to said support plate and operated by an actuator means, accessible through an opening in said face member.

10. The assembly of claim 1 in which said device comprises a dimmer, mounted to said support plate and operated by an actuator means, accessible through an opening in said face member.

11. The assembly of claim 9 in which said actuator means comprises a push-button.

12. The assembly of claim 10 in which said dimmer is a linear slide dimmer and said actuator is a slider operable to increase and decrease power provided to an electrical load.

13. The assembly of claim 12 further comprising means for capturing said slider to prevent its removal without a tool.

14. The assembly of claim 1 in which said intermediate plate is translucent.

15. The assembly of claim 14 in which said face member is translucent.

16. The assembly of claim 14 further comprising a lamp for backlighting said intermediate plate.

17. A multi-device assemblage of:
   (A) a plurality of wallbox-mountable electrical assemblies, each comprising, in combination,
      (a) a wiring device;
      (b) a generally flat support plate supporting said device, removably attachable to said wallbox; and
      (c) a generally flat and rectangular intermediate plate, removably attached to said support plate, having a particular height defined by two longitudinally-separated ends, a first surface that is adjacent to a surface of said support plate and, opposite said first surface, a second surface that faces outward when said plates are mounted in a wallbox, said second surface being interrupted by peripheral, outward-facing snaps at said longitudinally-separated ends of said intermediate plate; and
   (B) a generally rectangular face member having a height slightly greater than said particular height of each of said intermediate plates and a width slightly greater than the combined width of said plurality of intermediate plates, said face member having peripheral, inward-facing connectors demountably engaged with corresponding ones of said snaps on said intermediate plates.

18. A multi-device assemblage of:
(A) a plurality of wallbox-mountable electrical assemblies, each comprising, in combination,
  (a) a wiring device;
  (b) a generally flat support plate supporting said device, removably attachable to said wallbox; and
  (c) a generally flat and rectangular intermediate plate, removably attached to said support plate, having a particular width defined by two laterally-separated ends, a first surface that is adjacent to a surface of said support plate and, opposite said first surface, a second surface that faces outward when said plates are mounted in a wallbox, said second surface being interrupted by peripheral, outward-facing snaps at said laterally-separated ends of said intermediate plate; and
(B) a generally rectangular face member having a width slightly greater than said particular width of each of said intermediate plates and a height slightly greater than the combined height of said plurality of intermediate plates, said face member having peripheral, inward-facing connectors demountably engaged with corresponding ones of said snaps on said intermediate plates.

* * * * *